US009789920B2

(12) United States Patent
Hurst et al.

(10) Patent No.: US 9,789,920 B2
(45) Date of Patent: Oct. 17, 2017

(54) APPARATUS AND METHOD FOR ENERGY REGULATION AND LEG CONTROL FOR SPRING-MASS WALKING MACHINE

(71) Applicant: Oregon State University, Corvallis, OR (US)

(72) Inventors: Jonathan Hurst, Albany, OR (US); Mikhail Jones, Corvallis, OR (US); Siavash Rezazadeh, Addison, TX (US); Hamid Reza Vejdani Noghreiyan, Eugene, OR (US); Andrew Abate, Happy Valley, OR (US)

(73) Assignee: OREGON STATE UNIVERSITY, Corvallis, OR (US)

( * ) Notice: Subject to any disclaimer, the term of this patent is extended or adjusted under 35 U.S.C. 154(b) by 23 days.

(21) Appl. No.: 15/076,870

(22) Filed: Mar. 22, 2016

(65) Prior Publication Data
US 2016/0288848 A1 Oct. 6, 2016

Related U.S. Application Data

(60) Provisional application No. 62/141,323, filed on Apr. 1, 2015.

(51) Int. Cl.
G05B 15/00 (2006.01)
G05B 19/00 (2006.01)
B62D 57/032 (2006.01)
G06N 3/00 (2006.01)

(52) U.S. Cl.
CPC .......... *B62D 57/032* (2013.01); *G06N 3/008* (2013.01); *Y10S 901/01* (2013.01)

(58) Field of Classification Search
CPC ..... B62D 57/032; G06N 3/008; Y10S 901/01; Y10S 901/08; Y10S 901/09; Y10S 901/10
USPC .................................................. 700/245, 258
See application file for complete search history.

(56) References Cited

U.S. PATENT DOCUMENTS

| 5,650,704 | A | 7/1997 | Pratt | |
|---|---|---|---|---|
| 6,243,624 | B1 | 6/2001 | Wu | |
| 7,734,375 | B2 | 6/2010 | Buehler | |
| 8,500,823 | B2 * | 8/2013 | Herr | A61F 2/64 623/24 |
| 8,734,528 | B2 * | 5/2014 | Herr | A61F 2/60 623/24 |
| 8,864,846 | B2 * | 10/2014 | Herr | A61F 2/66 623/25 |
| 8,900,325 | B2 * | 12/2014 | Herr | A61F 2/60 601/5 |
| 8,914,151 | B2 | 12/2014 | Hurst | |
| 9,333,097 | B2 * | 5/2016 | Herr | A61F 2/60 |
| 2004/0148268 | A1 * | 7/2004 | Reil | B25J 9/161 700/247 |

(Continued)

OTHER PUBLICATIONS

Robinson, D., et al., "Series Elastic Actuator Development for a Biomimetic Walking Robot", ASME Int'l Conf on Adv. Intelligent Mechatronics, Sep. 19-22, 1999.

(Continued)

*Primary Examiner* — Jaime Figueroa
(74) *Attorney, Agent, or Firm* — Niels Haun; Dann, Dorfman, Herrell and Skillman, P.C.

(57) ABSTRACT

A robot for legged locomotion incorporating passive dynamics with touchdown and takeoff control and method.

15 Claims, 8 Drawing Sheets

(56) References Cited

U.S. PATENT DOCUMENTS

| | | | | |
|---|---|---|---|---|
| 2004/0255711 | A1* | 12/2004 | Takenaka | B25J 19/0008 74/490.01 |
| 2005/0085948 | A1* | 4/2005 | Herr | B62D 57/032 700/258 |
| 2005/0113973 | A1* | 5/2005 | Endo | B25J 9/161 700/245 |
| 2006/0243086 | A1* | 11/2006 | Cutkosky | B25J 9/104 74/490.02 |
| 2007/0150110 | A1* | 6/2007 | Delson | B62D 57/02 700/245 |
| 2008/0150465 | A1* | 6/2008 | Baba | B62D 57/032 318/568.12 |
| 2010/0324699 | A1* | 12/2010 | Herr | A61F 2/66 623/27 |
| 2011/0208444 | A1* | 8/2011 | Solinsky | A61B 5/112 702/41 |
| 2013/0013111 | A1* | 1/2013 | Hurst | B62D 57/032 700/258 |
| 2013/0226048 | A1* | 8/2013 | Unluhisarcikli | A61H 3/00 601/34 |

OTHER PUBLICATIONS

Pratt, J., et al., "Exploiting Natural Dynamics in the Control of a Planar Bipedal Walking Robot", Proceedings of the Thirty-Sixth Annual Allerton Conference on Communication, Control, and Computing, Monticello, Illinois, Sep. 1998.

Pratt, G., et al., "Series Elastic Actuators" in IEEE International Conference on Intelligent Robots and Systems, vol. 1, pp. 399-406, 1995.

Koepl, D., et al., "Force Control for Planar Spring-Mass Running" in Intelligent Robots and Systems (IROS), 2011 IEEE/RSJ International Conference Ligent Robots and Systems (IROS), 2011 IEEE/RSJ International Conference.

Koepl, D., et al., "Force Control for Spring-Mass Walking and Running" in Advanced Intelligent Mechatronics (AIM), 2010 IEEE/ASME International Conference on, Jul. 8, 2010.

"A View on Machine Vision", Packaging Magazine, Packaging, Techpages, p. 26-27, Jul. 2008.

Hubicki, C., "Adjustable-Compliance Legs. Why Bother?", 4 pages, Jun. 14, 2012.

Seyfarth, A., et al., "Swing-leg Retraction: A Simple Cotnrol Model for Stable Running", The Journal of Experimental Biology 206, 2547-2555, 2003, The Company of Biologists Ltd.

Seyfarth, A., et al., "Natural Control of Spring-Like Running: Optimised Selfstablisation" In CLAWAR, 2002.

Collins, S., et al., "Efficient Bipedal Robots Based on Passive-Dynamic Walkers", Feb. 18, 2005, vol. 307, Science, pp. 1082-1085.

Tello, E., Review of "Legged Robots that Balance" by M. Raibert, p. 89, 1986.

Raibert, M., et al., "BigDog, the Rough-Terrain Quadruped Robot", Proceedings of the 17th World Congress, The International Federation of Automatic Control, Seoul, Korea, Jul. 6-11, 2008, pp. 10822-10825.

McGuigan, M, et al., "The Effect of Gait and Digital Flexor Muscle Activation on Limb Compliance in the Forelimb of the Horse Equus Caballus", The Journal of Experimental Biology 206, pp. 1325-1336, 2003, The Company of Biologists Ltd.

Sreenath, K., et al., "A Compliant Hybrid Zero Dynamics Controller for Stable, Efficient and Fast Bipedal Walking on MABEL", Int. J. Rob. Res. 30, 1170 (Aug. 2011).

Kemper, K., et al., "Optimal Passive Dynamic for Torque/Force Control", International Conference on Robotics and Automation, Sep. 15, 2010, 6 pages.

Hurst, J., et al., "An Actuator with Physically Variable Stiffness for Highly Dynamic Legged Locomotion", International Conf. on Robotics and Automation, New Orleans, LA Apr. 26-May 1, 2004.

McGuigan, M., et al., "Horse's Leg Set to Spring, \pogo stick\ horse legs need better track surfaces," Journal of Experimental Biology, vol. 206, p. 1261, 2003.

Ferris, D., et al., "Interaction of Leg Stiffness and Surface Stiffness During Human Hopping", 1997 the American Physiological Society, pp. 15-22.

Farley, C., et al., "Mechanism of Leg Stiffness Adjustment for Hopping on Surfaces of Different Stiffness", American Physiological Society, pp. 1044-1055, 1998.

Cavagna, G., "Storage and utilization of elastic energy in skeletal muscle," Exercise Sports Science, vol. 5, pp. 89-129, 1977.

"Faster Processing, Faster Payback", Packaging Magazine, Techpages, p. 25, Jul. 2008.

Daley, M, et al., "Running over rough terrain: Guinea fowl maintain dynamic stability despite a large unexpected change in substrate height," The Journal of Experimental Biology, vol. 209, pp. 171-187, 2006.

Ernst, M, et al. "Spring-legged locomotion on uneven ground: a control approach to keep the running speed constant" in Proc 12th Int Conf on Climbing and walking Robots (CLAWAR), 2009.

Blickhan, R., "The Spring-Mass Model for Running and Hopping," J. of Biomech., vol. 22, pp. 1217-1227, 1989.

Ahmadi, M, et al., "Controlled passive dynamic running experiments with the arl-monopod ii," IEEE Transactions on Robotics, vol. 22, pp. 974-986, Oct. 2006.

Ahmadi, M., et al., "A control strategy for stable passive running", in IEEE Conf. on Intelligent Systems and Robots, pp. 152-157,1995.

Collins, S., et al., "A Bipedal Walking Robot with Efficient and Human-Like Gait*", International Conference on Robotics and Automation, Barcelona, Spain, Apr. 2005, pp. 1983-1988.

Collins, S., et al., "A 3-d passive dynamic walking robot with two legs and knees," International Journal of Robotics Research, vol. 20, pp. 607-615, 2001.

Verrelst, B., et al., "Novel robotic applications using adaptable compliant actuation. an implementation towards reduction of energy consumption for legged robots," Mobile Robots, Moving Intelligence, pp. 513-534, Dec. 2006.

Geyer, H., et al., "Spring-mass running: Simple approximate solution and application to gait stability," Journal of Theoretical Biology, vol. 232, p. 315-328, 2005.

Grimes, J.A., et al., "The Design of Atrias 1.0 a Unique Monopod, Hopping Robot", Apr. 9, 2012, WSPC—Proceedings Trim Size: 9in×6in, pp. 1-7.

"Healthy Production Healthy Profit", Packaging Magazine, Packaging, Trends, p. 20-21, Jul. 2008.

R. M. Alexander, "Tendon elasticity and muscle function," 2002.

M. A. Daley, "Biomechanics: Running over uneven terrain is a no-brainer," Current Biology, vol. 18, No. 22, pp. R1064-R1066, 2008.

R. Blickhan, A. Seyfarth, H. Geyer, S. Grimmer, H. Wagner, and M. Günther, "Intelligence by mechanics," Phil. Trans. R. Soc. A, vol. 365, No. 1850, pp. 199-220, 2007.

T. McGeer, "Passive dynamic walking," The International Journal of Robotics Research, vol. 9, No. 2, pp. 62-82, 1990.

P. A. Bhounsule, J. Cortell, and A. Ruina, "Design and control of ranger: an energy-efficient, dynamic walking robot," in Proc. CLAWAR, 2012, pp. 441-448.

H. Geyer, A. Seyfarth, and R. Blickhan. "Compliant leg behaviour explains basic dynamics of walking and running." Proceedings of the Royal Society B-Biological Sciences, 273(1603):2861-2867, 2006.

H. Geyer, R. Blickhan, and A. Seyfarth, "Natural dynamics of spring-like running: Emergence of selfstability," in 5th International Conference on Climbing and Walking Robots, vol. 92, 2002.

J. Schmitt, M. Garcia, R. C. Razo, P. Holmes, and R. J. Full, "Dynamics and stability of legged locomotion in the horizontal plane: a test case using insects," 2002.

K. Papantoniou, "Electromechanical design for an electrically powered, actively balanced one leg planar robot," in IEEE/RSJ International Workshop on Intelligent Robots and Systems \91.\Intelligence for Mechanical Systems, Proceedings IROS \91, 1991, pp. 1553-1560 vol. 3.

(56) References Cited

OTHER PUBLICATIONS

S. Hyon and T. Mita, "Development of a biologically inspired hopping robot—"kenken"," in IEEE International Conference on Robotics and Automation, 2002. Proceedings. ICRA \02, vol. 4, 2002, pp. 3984-3991 vol. 4.

J. W. Hurst, "The electric cable differential leg: a novel design approach for walking and running," 2011.

A. Sprowitz, A. Tuleu, M. Vespignani, M. Ajallooeian, E. Badri, and A. J. Ijspeert, "Towards dynamic trot gait locomotion: Design, control, and experiments with cheetah-cub, a compliant quadruped robot," the International Journal of Robotics Research, vol. 32, No. 8, pp. 932-950, 2013.

M. H. Raibert, H. B. Brown, and M. Chepponis, "Experiments in balance with a 3d one-legged hopping machine," The International Journal of Robotics Research, vol. 3, No. 2, pp. 75-92, 1984.

B. Andrews, B. Miller, J. Schmitt, and J. E. Clark, "Running over unknown rough terrain with a one-legged planar robot," 2011.

B. Brown and G. Zeglin, "The bow leg hopping robot," in Proceedings. IEEE International Conference on Robotics and Automation, 1998., vol. 1, 1998, pp. 781-786 vol. 1.

J. D. G. Kooijman et al., "A bicycle can be self-stable without gyroscopic or caster effects." Science Magazine, Apr. 15, 2011 2011.

J. P. Meijaard et al., . "Linearized dynamic equations for the balance and steer of a bicycle: a benchmark and review." Proceedings of the Royal Society A, 463:1955-1982, 2007.

M. Wisse and A. Schwab. "Skateboards, bicycles, and three-dimensional biped walking machines: Velocity-dependent stability by means of lean-to-yaw coupling." The International Journal of Robotics Research, 24:417-429, 2005.

G. Zeglin and H. B. Brown. "Control of a bow leg hopping robot." In IEEE International Conference on Robotics and Automation, May 1998.

T. M. Kubow and R. J. Full. "The role of the mechanical system in control; a hypothesis of self stabilization in hexapedal runners." Phil. Trans. R. Soc. Lond., 1999.

S. Gatesy, R. Kambic, and T. J. Roberts. "Long-axis rotation (lar): a missing degree of freedom in avian bipedal locomotion." In Proceedings of the 2012 Dynamic Walking Conference, 2012.

Hubicki, C. et al., "ATRIAS: Enabling Bipedal Agility and Efficiency with a3D-Capable Spring-Mass Robot Design,".

J.W. Grizzle, et al., "MABEL, a New Robotic Bipedal Walker and Runner," 2009 American Control Conference, Hyatt Regency Riverfront, St. Louis, MO, USA, Jun. 10-12, 2009.

\* cited by examiner

APPARATUS AND METHOD FOR ENERGY REGULATION AND LEG CONTROL FOR SPRING-MASS WALKING MACHINE

RELATED APPLICATIONS

This application claims the benefit of priority of U.S. Provisional Application No. 62/141,323, filed on Apr. 1, 2015, the entire contents of which application(s) are incorporated herein by reference.

GOVERNMENT LICENSE RIGHTS

This invention was made with government support under contract number W91CRB-11-1-0002 awarded by the Defense Advanced Research Projects Agency (DARPA). The Government has certain rights in the invention.

FIELD OF THE INVENTION

The present invention relates generally to devices and methods for legged locomotion, such as robots for legged locomotion incorporating passive dynamics with without the need for active force control.

BACKGROUND OF THE INVENTION

Walking and running robots, in general, have significant ground to cover before they can approach the abilities of animals. Walking and running animals are able to attenuate significant disturbances, such as uneven ground, while maintaining excellent energy economy. Existing passive walkers, such as the Cornell Walker, are capable of energy economy similar to animals, but will fall in the presence of small disturbances. Robots that rely primarily on active control, such as Boston Dynamics' "BigDog," can demonstrate impressive robustness to disturbances at the expense of energy economy. In contrast, humans and animals make excellent use of passive dynamics, but also use active control to compensate for disturbances. For example, guinea fowl are able to accommodate a drop in ground height by rapidly extending their leg into an unexpected disturbance, resulting in only slight deviation from their undisturbed gait. Furthermore, biomechanics studies suggest that humans and animals adjust muscle activation to accommodate changes in ground stiffness during hopping, walking, and running These types of active responses to ground disturbances are important on physical systems, where deviations from the undisturbed gait can lead to a loss of stability, falls, or springs exceeding their maximum deflection, potentially causing damage. Spring-mass models consisting of a mass bouncing on a spring provide a good approximation for animal running. However, while the simple spring-mass model is capable of some passive stability, without careful control of the leg angle at touchdown it tends to become unstable and fall.

A simple leg angle controller based on tuplets of natural frequency, zero-force leg length, apex hop height, and horizontal velocity may yield stable hopping gaits. Existing methods for selecting leg touchdown angles have included hand-tuned gain based controllers and constant leg retraction velocity control. (A. Seyfarth, H. Geyer, and H. Herr, "Swing-leg retraction: A simple control model for stable running," *The Journal of Experimental Biology*, vol. 206, pp. 2547-2555, 2003.) However, these methods require tuning, and are subject to controller optimality.

A more reliable method of selecting a leg touchdown angle for SLIP model running, presented by Ernst et al., prevents falls by ensuring a center of mass trajectory during stance that is symmetrical about midstance. (M. Ernst, H. Geyer, and R. Blickhan, "Spring-legged locomotion on uneven ground: A control approach to keep the running speed constant," in *Proceedings of the 12th International Conference on Climbing and Walking Robots (CLAWAR)*, 2009). As used herein this type of gait will be referred to as an equilibrium gait, because every stride is the same as the last. In the interest of brevity, Ernst et al.'s method of selecting the leg touchdown angle will be referred to as the Ernst-Geyer-Blickhan (EGB) method. More recently, Hurst et al. have utilized active force control to improve legged locomotion as disclosed in U.S. Pat. No. 8,914,151.

It remains the case that when controlling a walking or running gait, one key challenge is the transition between swing (or flight) and stance for each leg and foot, also called a "Hybrid System." The physics model of the system is different when the foot is in the air versus when it is on the ground. This presents challenges for the control and design of a machine. Thus, there remains a need in the art to create robots that better address the transition between swing (or flight) and stance, particularly for damped spring-mass legged machines.

SUMMARY OF THE INVENTION

In one of its aspects the present invention relates to devices and methods incorporating a control strategy for spring-mass legged locomotion gaits which is robust to disturbances, while still utilizing the passive dynamic behavior of the mechanical model for energy economy. The strategy combines several concepts. In one aspect of the present invention, the devices approximate a bipedal spring-mass system, such that compliance isolates the toe impact with the ground from significant mass in actuators, transmissions, or robot leg or body components. The spring-mass mechanism of the present invention should incorporate some energy dissipation in the mechanism or actuator, and extend the leg during the second half of stance to replace lost energy. In a further aspect of the present invention, the control strategy should be largely the same in the instants before and after ground impact; in other words, the control of the swing leg at the end of swing should be the same as the control of the stance leg at the beginning of stance. This creates robustness to uncertainty in ground contact events, without requiring active force control, as implemented in U.S. Pat. No. 8,914,151. In addition, in accordance with the present invention forward velocity may be regulated by scaling the leg extension (energy injection) as a direct function of forward velocity or other approximation of gait energy, whereby stride length can remain constant.

For example, the present invention may provide a robot for legged locomotion comprising first and second extendable legs each having opposing first and second end and first and second leg motors each coupled to the first extendable leg. The motors may be operable to swing the first leg about the first end and extend or retract the first leg along a leg length direction. At least one leg spring may be disposed in series between the leg motors and the first leg, and may be configured to store energy therein during a touchdown part of a stance and configured to recover the stored energy during a liftoff part of the stance to provide passive dynamic locomotion. One or more sensors may be configured to measure a torque in the leg angle direction of the first leg proximate the first end thereof and configured to measure a force in the leg length direction of the first leg. A controller may be disposed in communication with the sensor and the motors, and may be configured to constrain the second end of the first leg to a column above a specified contact area of the surface at which the second end of the first leg is to be placed on touchdown.

In addition, the present invention may provide a method for controlling the transition between leg swing and stance for legged robot locomotion on a surface. The method may include providing a robot having first and second extendable legs with opposing first and second ends, and having first and second leg motors coupled to the first extendable leg. The motors may be operable to swing the first leg about the first end to extend or retract the first leg along a leg length direction. In addition, at least one leg spring may be disposed in series between the leg motors and the first leg. The at least one leg spring may be configured to store energy therein during a touchdown part of a stance and configured to recover the stored energy during a liftoff part of the stance to provide passive dynamic locomotion. The method may further include measuring a force in the leg length direction of the first leg and measuring the torque in the leg angle direction of the first leg proximate the first end thereof. In addition, the method may include commanding the leg motors to constrain the second end of the first leg to a column above a specified contact area of the surface at which the second end of the first leg is to be placed on touchdown. Yet another method in accordance with the present invention may provide scaling the transition between a swing phase and a stance phase controller based on a defined component of a measured ground reaction force.

BRIEF DESCRIPTION OF THE DRAWINGS

The foregoing summary and the following detailed description of the exemplary embodiments of the present invention may be further understood when read in conjunction with the appended drawings, in which.

DETAILED DESCRIPTION OF THE INVENTION

In one of its aspects, the present invention relates to devices and methods using passive dynamics to achieve bipedal robotic locomotion. In particular, the devices and methods of the present invention can address the transition between leg swing (or flight) and stance for damped spring-mass legged machines.

Theoretical Model

Figure 1A:
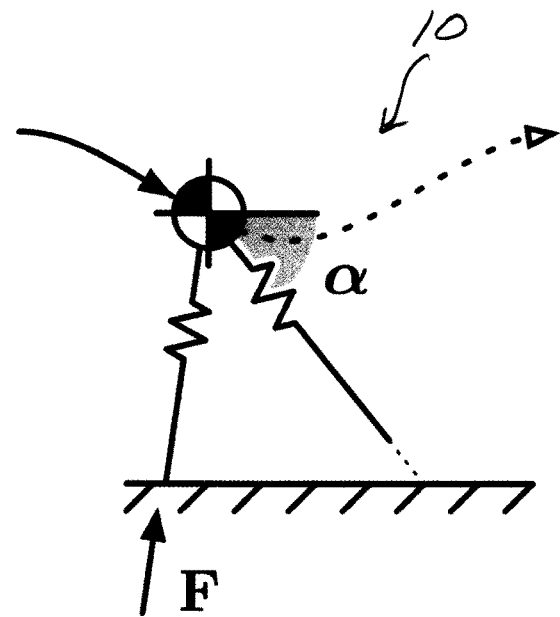
FIG. 1A schematically illustrates a passive bipedal spring loaded inverted pendulum (SLIP) model.
Figure 1B:
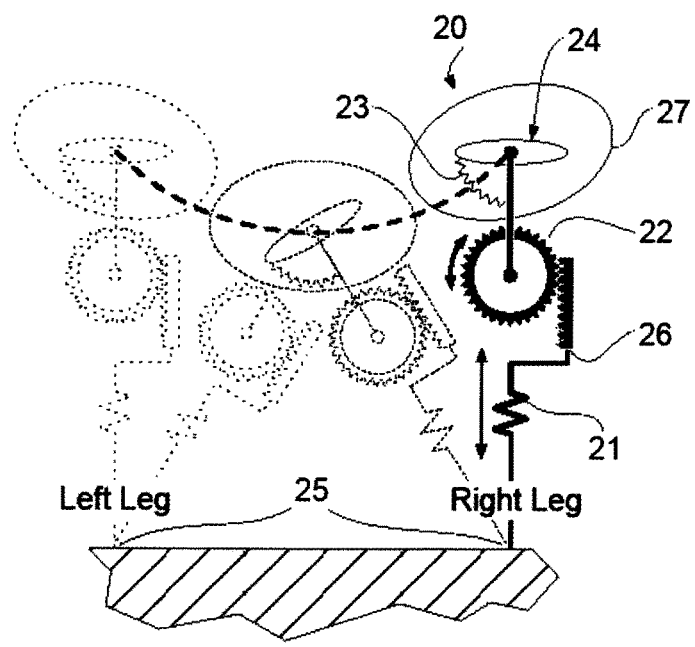
FIG. 1B schematically illustrates an exemplary actuated bipedal spring-mass model of an apparatus in accordance with the present invention.

Turning to a theoretical spring-mass model 10, a bipedal spring loaded inverted pendulum (SLIP) including spring 11, FIG. 1A, is augmented to represent exemplary devices in accordance with the present invention. Specifically, hip and leg actuation are added as well as a body 27 having moment of inertia to arrive at an exemplary realistic model 20 for robot running in accordance with the present invention, FIG. 1B. The model 20 includes an extendable leg 26 with a leg motor 22 operably connected thereto to extend or retract the leg 26 along the leg length direction L. Leg mass is omitted from the model to keep the system as simple as possible, with the further goal to minimize toe mass (e.g., less than five or seven percent, for example) relative to the total mass of a device built in accordance with the model 20. The leg motor 22 makes use of the leg spring 21, while a second rotational spring 23 is included at a hip motor 24. The hip motor 24 may set the leg angle during flight and maintain zero moment about the hip during stance such that the model 20 behaves like the passive model 10 during undisturbed walking.

The leg spring stiffness may be tuned to the natural frequency of the desired spring-mass gait, so energy will be stored in the spring 21 during the first part of stance, and then recovered as the body mass accelerates towards liftoff. In the ideal scenario, the leg motor 22 does no work, the hip motor 24 is only responsible for moving its own inertia and does no work on the environment, and all of the model's behavior is expressed by the passive dynamics of the system as it bounces forward.

Kinetic equations of motion may be used to simulate the model 20 walking in a vertical plane. Although developing these non-linear equations is straightforward for both the standard spring-mass model 10 and the model 20, finding a closed-form solution for the trajectories of either is impossible. However, approximate numerical solutions can be generated using ordinary differential equation solvers.

Control Strategy

In stance, a stance controller may provide PD torque control of the hip motor 24, and may be used to approximate an ideal hinge, such that the model 20 behaves like a SLIP model 10 in stance with a point mass body. The hip motor 24 should track the motion of the leg 26 in stance to maintain zero deflection of the hip spring 23; this task is equivalent to maintaining zero force against a moving load.

Example

Figure 2A:
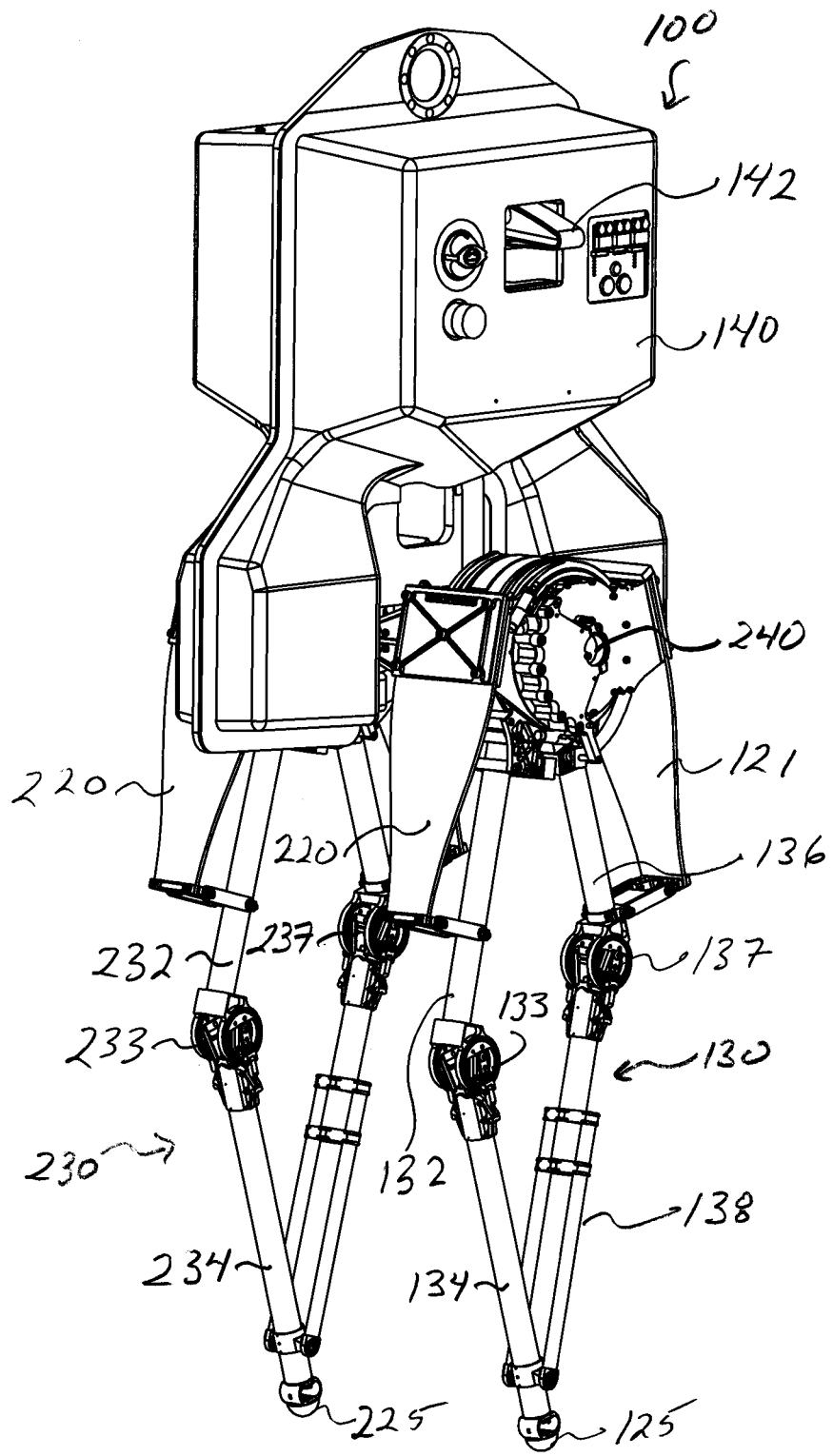
FIGS. 2A-2C schematically illustrate isometric, side, and front views, respectively of an exemplary bipedal, spring-mass robot for legged locomotion in accordance with the present invention.
Figure 2B:
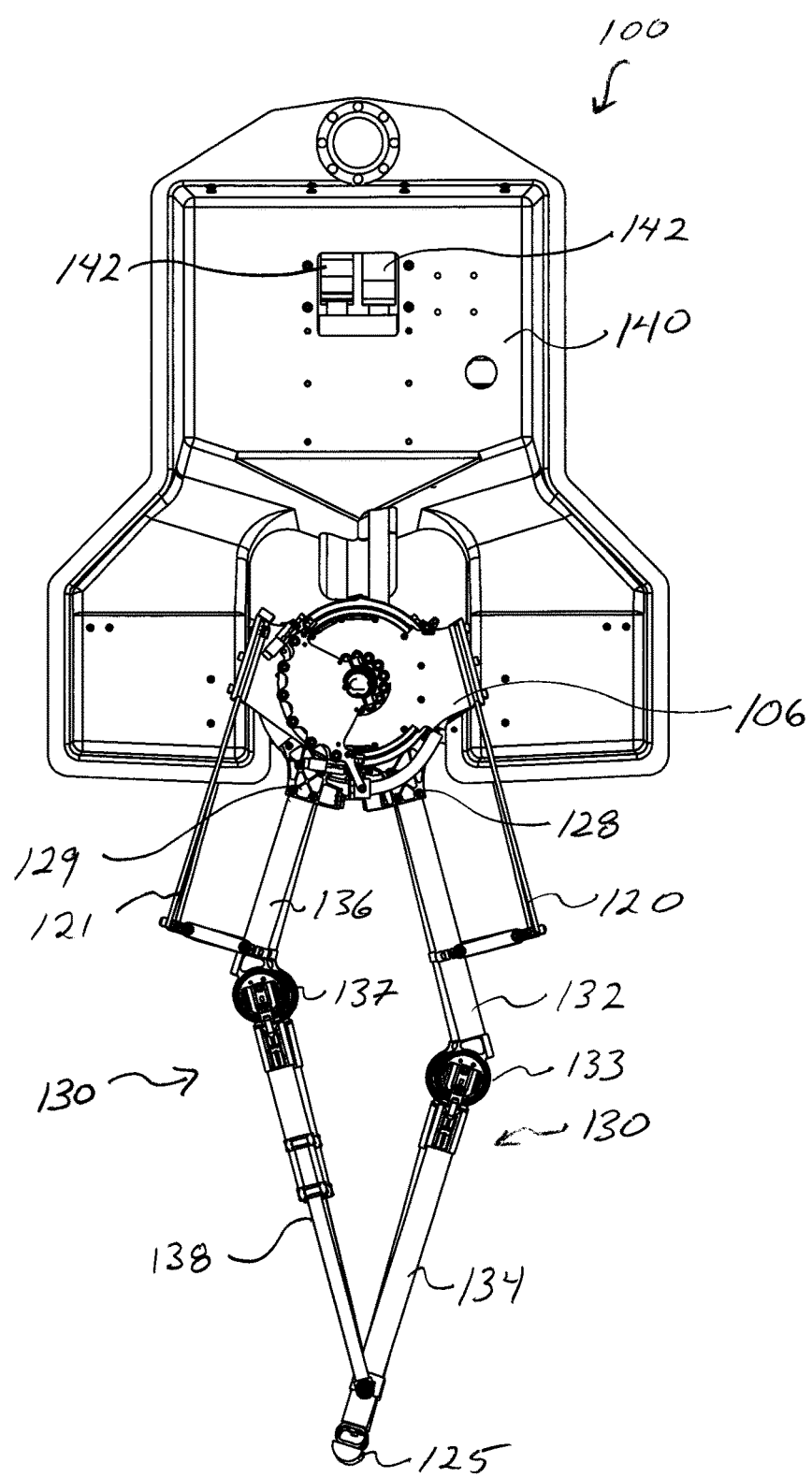
Figure 2C:
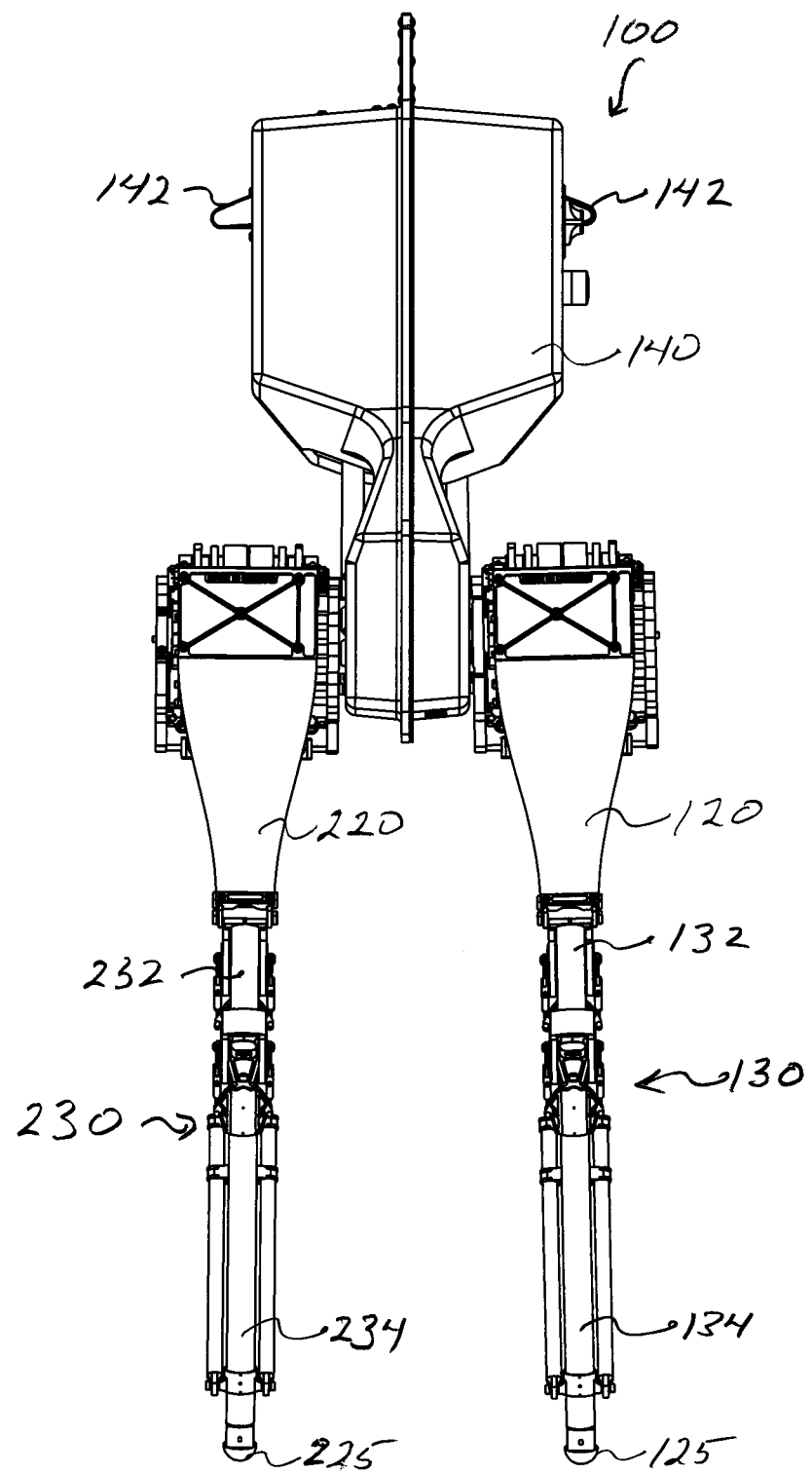

Based on the principles embodied in the model 20 and favorable results evidenced in the simulations, a bipedal robot 100 for legged locomotion was constructed in which closely matched a spring-mass model, with actuation to overcome inevitable energy losses and model mismatches, FIGS. 2A-2C. The legs 130, 230 were provided in the form of a four-bar linkage each comprising an posterior thigh segment 132, 232 and posterior shin segment 134, 234 pivotally joined at a posterior knee joint 133, 233 along with an anterior shin segment 136, 236 and an anterior thigh segment 138, 238 pivotally joined at an anterior knee joint 137, 237. The anterior thigh segments 138, 238 were pivotally attached to respective posterior shin segments 134, 234 intermediate the posterior knee joints 133, 233 and respective toes 125, 225 of the posterior shin segment 134, 234. The upper ends of each of the leg segments 132, 136 were pivotally mounted to a motor housing 106 via respective free pivot bearings 128, 129, FIG. 2B.

To minimize energy loss on ground impact (and to minimize impulses that can damage the robot 100 or destabilize the gait), the legs 130, 230 were constructed to minimize the un-sprung mass to approximate the massless leg of the model 20. The leg compliance was selected to smooth the force of unexpected impact. Ground reaction forces with a rigid system (no spring) will show a large impulse at impact. With compliance, the force at the instant after impact remains zero, and gradually ramps up as the leg 130, 230 deflects. The compliance eliminates impact impulses, and gives the control system and the actuators time to react and control the forces. Leg compliance passively maintains the supporting leg force. (In contrast, rigid mechanisms are either in contact or they are not, there is no in between; chatter and vibrations are, thus, a problem. With elastic legs, motions within the deflection of the leg maintain ground contact pressure.) Specifically, the leg segments 132, 232, 134, 234, 136, 236, 138, 238 were constructed from filament-wound carbon fiber tubes (carbon tube #30065, Rock West Composites, West Jordan, Utah).

The robot 100 incorporated leg springs 120, 220, 121, 221 designed for energy storage and performance and tuned to the gait of the robot 100. The spring size was selected such that the springs 120, 220, 121, 221 stored all the energy of the hopping or walking gait. One end of each thigh leg spring 120, 220 was pivotally mounted to a respective posterior thigh segment 132, 232 intermediate the two ends of the respective posterior thigh segment 132, 232, while one end of the shin spring 121, 221 was pivotally mounted to a respective anterior shin segment 136, 236 proximate the anterior knee joint 137, 237. The leg springs 120, 220, 121, 221 were provided in the form of fiberglass plate springs 0.3 inches thick, 6.3 inches tapered to 2.7 inches wide, and 15.5 inches long using GC-67-UB Bar stock (Gordon Composites, Inc., Montrose, Colo.).

Figures 3A, 3B:
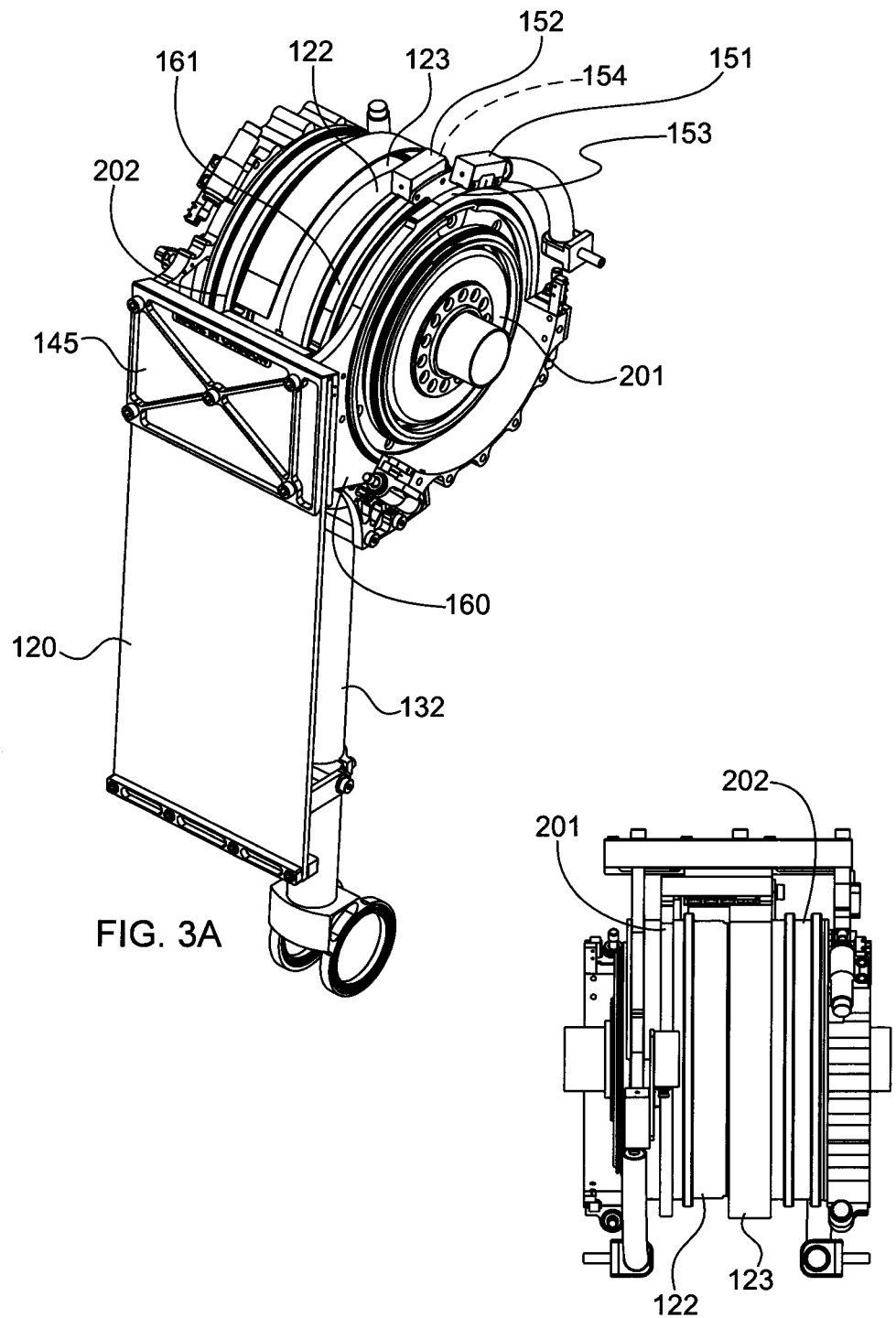
FIGS. 3A and 3B schematically illustrate isometric and side elevational views, respectively, of the leg motors, harmonic drives, and plate springs contained in the robot of FIGS. 2A-2C.

First and second rotary leg motors 122, 123 (Emoteq Megaflux MF0150. Allied Motion, Amherst, N.Y.) were provided at a location above each leg 130, 230 so that the mass of the motors 122, 123 was not placed on the leg segments 132, 232, 134, 234, 136, 236, 138, 238 themselves, and so that the mass of the motors 122, 123 was located near the center of the hip, as in the spring-mass model 20, FIGS. 3A, 3B. The leg motors 122, 123 were mounted to a proximal end of respective leg springs 120, 220, 121, 221 using respective spring clamps 143, 145. In one configuration, harmonic drive units 201, 202 were used to couple to the output of the leg motors 122, 123 to the leg springs 120, 220, 121, 221. (CSD50. Harmonic Drive LLC, Hauppauge, N.Y.).

Thus, the leg springs 120, 220, 121, 221 were conveniently placed in series with respective leg segments 132, 232, 136, 236 and respective leg motors 122, 123, such that when the motors 122, 123 applied a torque, the torque was applied to the proximal end of the respective leg spring 120, 220, 121, 221 via drives 200, 201. The applied torque was transmitted through the leg spring 120, 220, 121, 221 to effect movement of the corresponding leg segment 132, 232, 136, 236. However, during walking on undisturbed ground (i.e., a flat rigid surface), the motors 122, 123 were not necessarily affected by changes in leg length, which may be due solely to spring deflection.

The leg springs 120, 220, 121, 221 were selected so that the spring-mass mechanism incorporated some dissipation in the mechanism or actuator, and extended the legs 130, 230 during the second half of stance to replace lost energy. This approach allowed passive absorption of energy in the oscillation of a walking or running gait, and caused the passive dynamics of the spring-mass system to synchronize with the controller energy injection. This interaction between mechanism and actuator control allowed disturbances to gradually die out from the system, and allowed the system to settle again on the appropriate oscillation for a walking or running gait. In this particular exemplary prototype bipedal robot 100, the springs were selected to be approximately twice as stiff as is required for the appropriate spring-mass oscillation frequency for a walking gait. The motors 122, 123 had a soft PD controller on leg extension, such that approximately 50% of leg extension was due to spring deflection, and 50% was due to actuator backdriving, and the resulting total leg deflection had appropriate stiffness for a walking gait. The motors 122, 123 had substantial friction in the transmissions, as well as energy removed by the damping term in the controller. The set position of the leg extension motor 122, 123 was held constant through the first half of stance, and after midstance, extended the leg 130 by a defined amount to add energy in the second half of stance.

Figure 4:
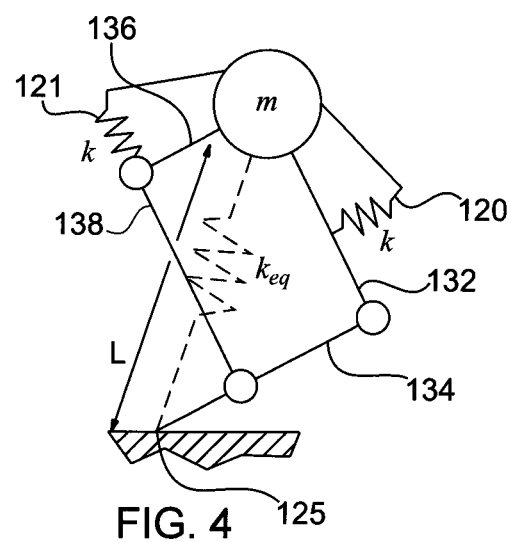
FIG. 4 schematically illustrates an actuated spring-mass model of one leg of the robot of FIGS. 2A-2C.
Figure 5A:
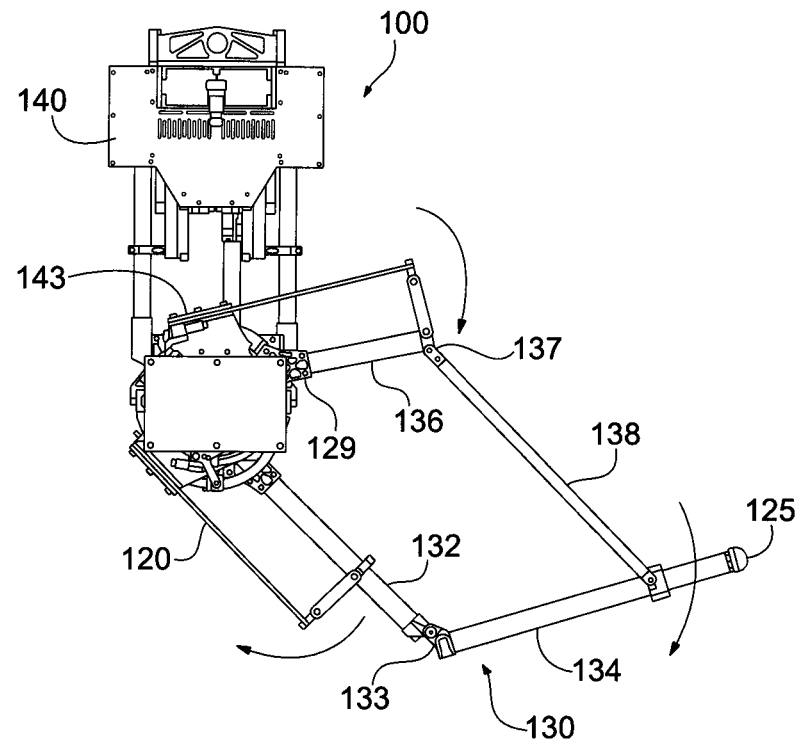
FIGS. 5A and 5B schematically illustrate leg swing of the robot of FIGS. 2A-2C effected by co-rotation of the leg motors.
Figure 5B:
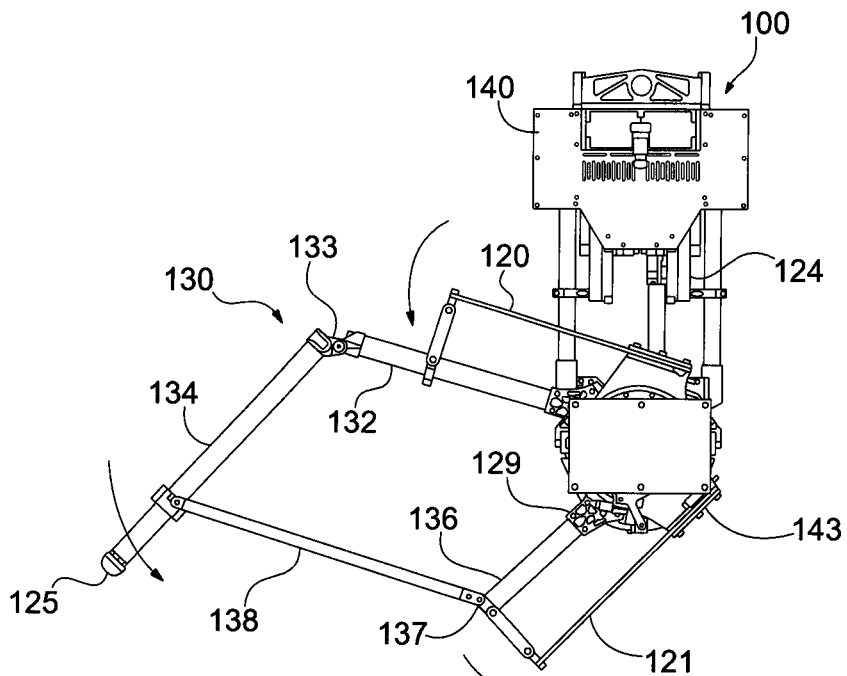

For applying forces in the leg length direction L (the leg length direction is defined as being along the line extending between the center of mass, m, and a respective toe 125, FIG. 4), the four-bar linkage allowed both motors 122, 123 of each leg 130, 230 to apply torques, meaning that all motors 122, 123 were engaged in applying ground reaction forces, rather than a single hip motor acting as deadweight while a single leg-length motor did all the work to lift the robot off the ground. Furthermore when extending each leg 130, 230 quickly, both motors 122, 123 counter-rotated, thus canceling any inertial effects on the body of the robot 100. Conversely, leg swing was accomplished by co-rotation of the leg motors 122, 123, FIGS. 5A, 5B.

Stance and stride duration may be measured by the progression of a virtual line from the toe 125, 225 to the hip 240 as the robot 100 moves through stance. Stance is primarily a passive dynamic behavior, because the robot 100 cannot apply torques to the ground with no ankles; once a toe 125, 225 is placed, the robot 100 will progress based on its spring-mass behavior. As the robot 100 progresses through stance, the swing leg (e.g., leg 130 if toe 225 is placed, or vice a versa) is slaved to a leg angle trajectory as a function of the stance parameter. (In the remainder of this disclosure, and for purposes of illustration only, leg 230 will be considered to be placed, and leg 130 the swing leg.) As used herein "leg angle" is the angle at the hip between along the leg length direction and a reference direction, such as vertical or horizontal, for example.

Leg swing, in one example of an implementation, begins with zero horizontal velocity at liftoff (because it began on the ground) and ends with zero velocity at touchdown (as it ends on the ground, or at least constrained to the column above a point on the ground). The equation describing the motion is a cubic spline, $y(t)=a0+a1*t+a2*t^2+a3*t^3$, with the coefficients a1, a2, and a3 solved to get the foot from start at zero velocity to end at zero velocity in the constrained amount of time. This trajectory is updated continuously, as a new end location is continually updated based on the velocity of the robot, until the toe is either A) fixed at a column above the ground after approximately 90% of the swing phase is complete, or B) applying ground reaction forces in the leg length direction sufficient to switch to stance phase control. This polynomial is a trajectory through space, and it either tracks time (clock) or a time-invariant parameter such as stance leg angle. We have done both, although our most 3D gaits make use of the clock-based parameter, and the time-invariant parameter only was used for the planar gait.

When the swing leg 130 is controlled by robot phase rather than a time-based trajectory, the swing leg 130 is guaranteed to always move forward in space to catch the robot 100 for the next step, assuming no actuator saturation. By decreasing the momentum of the robot 100 through dissipation, disturbance components of the momentum are removed. By adding energy through extension of the placed (rear) leg 230, momentum may be created in the desired direction of motion. Together, this behavior guides the robot 100 in the direction of motion, shrugging off disturbances. Thus, disturbances are not removed through active control, but instead through this interaction between the actuation and passive dynamics. In contrast, full active control to remove disturbances would require high accuracy models of the robot and high bandwidth actuators, which can be challenging or impossible to create. Reducing both the dissipation and the energy injection may increase efficiency, but may also decrease robustness to disturbances.

Precise proprioceptive sensing was also an important consideration in the design of the robot 100. High-resolution sensors allowed for very good velocity measurements, which is a significant limitation for many highly dynamic machines. Renishaw "Resolute" absolute optical encoder sensors 151, 152, (Renishaw Inc., Hoffman Estates, Ill.) were used, with a linear tape scale 153, 154 that was attached in a partial arc to mounting plates 160, 161 of the proximal end of each leg spring 120, 220 and upper end of the posterior thigh segments 132, 232, respectively, FIG. 3A. An additional pair of sensors and mounting plates were provided for each leg shin spring 121, 221 and anterior shin leg segment 136, 236. Thus, both the deflection of the leg springs 120, 220, 121, 221, which corresponded to the applied force, and the configuration of the legs 130, 230 could be measured. The sensors 151, 152 provided a 32-bit position value, which was significantly higher than most robot sensors. A hip motor 124 was mounted above the motor housing and fitted with a belt 142 to drive the leg 130, 230 laterally, giving the ability to side-step.

A controller for receiving signals from the sensors 151, 152, 153, 154 and sending control signals to the motors 122, 123, 124 was mounted in a casing 140. The controller was configured to detect, from the sensor data, a torque in the leg angle direction and a force in the leg length direction. The controller then commanded the leg motors 122, 123 to provide largely the same behavior in the instants before and after ground impact; in other words, the control of the swing leg 130 at the end of swing was the same as the control of the leg 130 as it becomes the stance leg. This approach created robustness to uncertainty in ground contact events.

Figure 6:
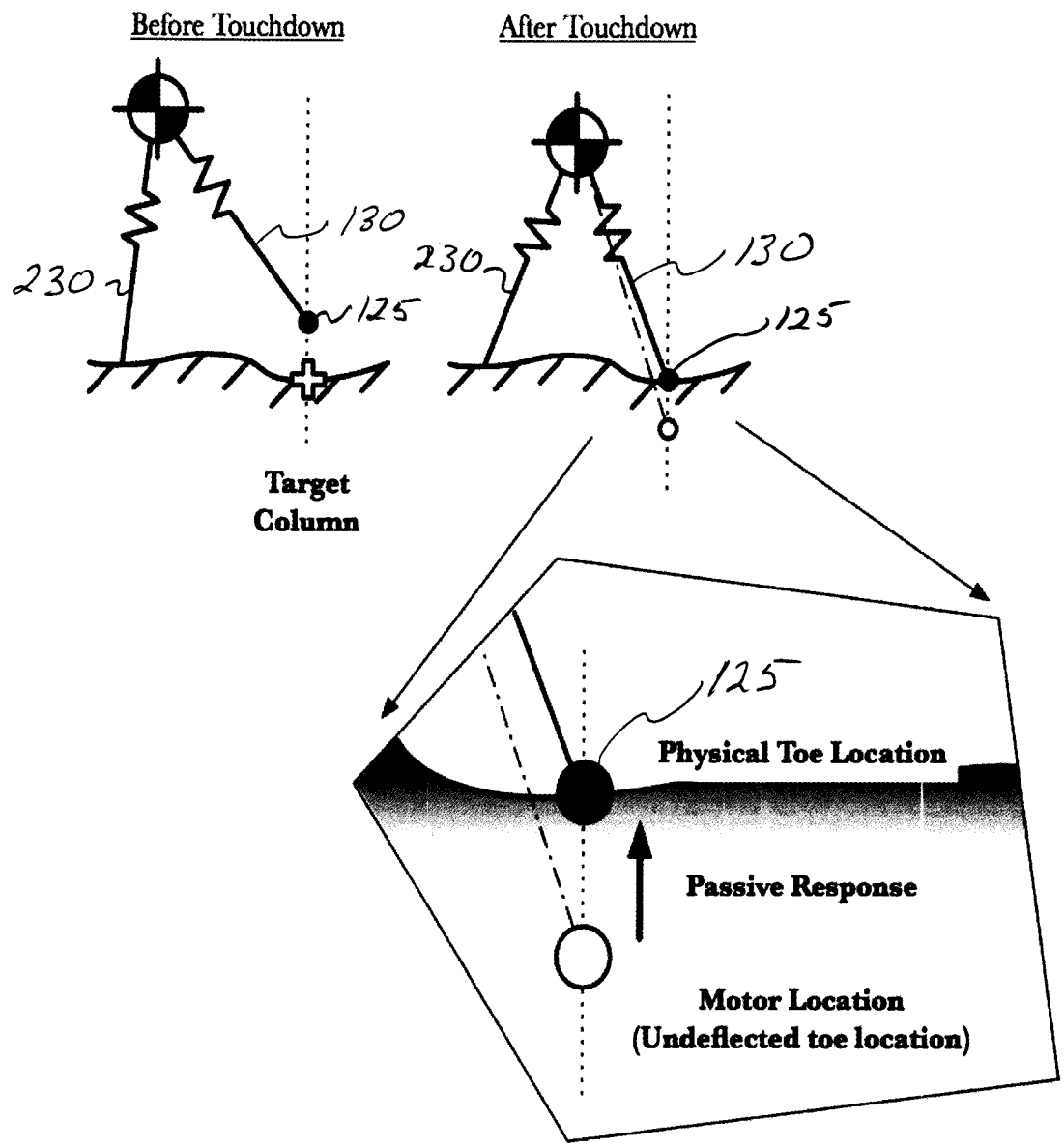
FIG. 6 schematically illustrates control of the leg(s)s of an exemplary robot, in accordance with the present invention, in which the terminus of the leg is constrained to an imaginary column above the desired contact area.

In a first exemplary configuration, control was implemented is as follows: during a period surrounding either a touchdown or takeoff event, the toe 125 of the swing leg 130 was constrained to an imaginary column above a desired contact area, FIG. 6. (The toe placement was regulated by forward velocity. In short, the machine type and the control methods were intertwined.) When the toe 125 was above the ground, this constraint resulted in ground speed matching and reduced toe chatter, slipping, and impact force on touchdown. When the toe 125 was on the ground, this behavior resulted in a ground reaction force primarily aligned with the leg 130, going through the hip 240, matching desired behavior for spring-mass gaits. In a second exemplary configuration, the transition from swing phase control to stance phase control was scaled based on force in the leg length direction. The stance leg torso control authority was scaled according to leg length force. This enabled a gradual transition handoff from swing control to stance control, based on leg length force rather than a discrete switch, and achieved the goal of a smooth change, where the control did not discretely change at the instant of impact, but only shifted gradually from a priority to control leg position during swing, to a priority of controlling hip torques to balance the body during stance.

For either of these two configurations, the controller switched from swing phase control policy to stance phase control policy when the measured leg forces increased beyond a particular threshold. This policy did not accurately detect the correct transition moment. However, because the swing and stance control policies were identical in the region of the transition moment, the robot 100 passively switched between swing and stance based on the real world contact, not a sensed contact. The controller only needed to switch such that the region of similarity overlapped the actual ground contact event. (This strategy was particularly advantageous, because discrete events such as touchdown and takeoff are extremely hard to sense, and switching behaviors based on an uncertain signal can be seen in the 'jerk' and 'snap' of a robot during transitions, or fast chatter as the robot rapidly switches states based on a toe switch, or other similar problems.) Lowering the leg 125 over the desired contact area can accommodate varying terrain height without needing information about exactly how high the real world contact will be or when it will occur.

In an additional aspect of the control in accordance with the present invention, the forward velocity was regulated by scaling the leg extension (energy injection) as a direct function of forward velocity. The stride length remained constant. If the robot 100 was moving faster than desired, less energy was added (the leg 225 extended less in the second half of stance). If the robot 100 was moving slower than desired, more energy was added (the leg 225 extended more in the second half of stance).

When the robot 100 was not walking, but instead standing in place or doing a "grounded hop," the leg length followed a time-based trajectory rather than a phase- or state-based trajectory.

These and other advantages of the present invention will be apparent to those skilled in the art from the foregoing specification. For example, while the present invention has been exemplified using bipedal machines, the devices and methods of the present invention extend to any number of legs, such as quadrupeds. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

All patents, patent applications, and publications mentioned herein are hereby incorporated by reference in their entireties to an extent not inconsistent with the above disclosure.

What is claimed is:

1. A robot incorporating passive dynamics for legged locomotion on a surface, comprising:
   first and second extendable legs each having opposing first and second ends;
   first and second leg motors each coupled to the first extendable leg, the motors operable to swing the first leg about the first end and extend or retract the first leg along a leg length direction;

at least one leg spring disposed in series between the leg motors and the first leg, the at least one leg spring configured to store energy therein during a touchdown part of a stance and configured to recover the stored energy during a liftoff part of the stance to provide passive dynamic locomotion;

one or more sensors configured to measure a torque in the leg angle direction of the first leg proximate the first end thereof and configured to measure a force in the leg length direction of the first leg; and a controller in communication with the sensor and the motors, the controller configured to constrain the second end of the first leg to a column above a specified contact area of the surface at which the second end of the first leg is to be placed on touchdown.

2. A robot incorporating passive dynamics for legged locomotion on a surface, comprising:

first and second extendable legs each having opposing first and second ends;

first and second leg motors each coupled to the first extendable leg, the motors operable to swing the first leg about the first end and extend or retract the first leg along a leg length direction;

at least one leg spring disposed in series between the leg motors and the first leg, the at least one leg spring configured to store energy therein during a touchdown part of a stance and configured to recover the stored energy during a liftoff part of the stance to provide passive dynamic locomotion;

one or more sensors configured to measure a torque in the leg angle direction of the first leg proximate the first end thereof and configured to measure a force in the leg length direction of the first leg; and a controller in communication with the sensor and the motors, the controller configured to scale the transition between a swing phase and a stance phase.

3. The robot according to claim 2, wherein the controller is configured to scale the transition between a swing phase and a stance phase based on a defined component of a measured ground reaction force.

4. The robot according to claim 1, wherein the controller configured to control the forward velocity of the robot by controlling the motors to retract or extend the first leg to remove or add energy, respectively, from the gait of the robot, the controller configured to scale the amount of leg retraction or extension as a direct function of a measured forward velocity and a desired forward velocity.

5. A robot incorporating passive dynamics for legged locomotion on a surface, comprising:

first and second extendable legs each having opposing first and second ends;

first and second leg motors each coupled to the first extendable leg, the motors operable to swing the first leg about the first end and extend or retract the first leg along a leg length direction;

at least one leg spring disposed in series between the leg motors and the first leg, the at least one leg spring configured to store energy therein during a touchdown part of a stance and configured to recover the stored energy during a liftoff part of the stance to provide passive dynamic locomotion;

one or more sensors configured to measure a torque in the leg angle direction of the first leg proximate the first end thereof and configured to measure a force in the leg length direction of the first leg; and a controller in communication with the sensor and the motors, the controller configured to control the forward velocity of the robot by controlling the motors to retract or extend the first leg to remove or add energy, respectively, from the gait of the robot, the controller configured to scale the amount of leg retraction or extension as a direct function of a measured forward velocity and a desired forward velocity.

6. The robot according to claim 5, wherein the first leg spring comprises a leaf spring.

7. The robot according to claim 5, wherein the one or more sensors provide a measure of the angular displacement of the first leg about its first end, and wherein the one or more sensors provide a measure of the length of the first leg.

8. The robot according to claim 5, wherein the controller is configured to determine the measured torque and force in the leg length direction and/or the leg angle direction from the displacement of the at least one leg spring.

9. A method for controlling the transition between leg swing and stance for legged robot locomotion on a surface, comprising:

providing a robot having first and second extendable legs with opposing first and second ends, and having first and second leg motors coupled to the first extendable leg, the motors operable to swing the first leg about the first end to extend or retract the first leg along a leg length direction, and at least one leg spring disposed in series between the leg motors and the first leg, the at least one leg spring configured to store energy therein during a touchdown part of a stance and configured to recover the stored energy during a liftoff part of the stance to provide passive dynamic locomotion;

measuring a force in the leg length direction of the first leg and measuring the torque in the leg angle direction of the first leg proximate the first end thereof; and commanding the leg motors to constrain the second end of the first leg to a column above a specified contact area of the surface at which the second end of the first leg is to be placed on touchdown.

10. A method for controlling the transition between leg swing and stance for legged robot locomotion, comprising:

providing a robot having first and second extendable legs and first and second leg motors coupled to a first end of the first extendable leg, the motors operable to swing the first leg about the first end to extend or retract the first leg along a leg length direction, and at least one leg spring disposed in series between the leg motors and the first leg, the at least one leg spring configured to store energy therein during a touchdown part of a stance and configured to recover the stored energy during a liftoff part of the stance to provide passive dynamic locomotion;

measuring a force in the leg length direction of the first leg and measuring the torque in the leg angle direction of the first leg proximate the first end thereof; and scaling the transition between a swing phase and a stance phase based on a defined component of a measured ground reaction force.

11. A method for controlling the transition between leg swing and stance for legged robot locomotion on a surface, comprising:

providing a robot having first and second extendable legs with opposing first and second ends, and having first and second leg motors coupled to the first extendable leg, the motors operable to swing the first leg about the first end to extend or retract the first leg along a leg length direction, and at least one leg spring disposed in series between the leg motors and the first leg, the at least one leg spring configured to store energy therein during a touchdown part of a stance and configured to recover the stored energy during a liftoff part of the stance to provide passive dynamic locomotion;

measuring a force in the leg length direction of the first leg and measuring the torque in the leg angle direction of the first leg proximate the first end thereof; and commanding the leg motors control the forward velocity of the robot to retract or extend the first leg to remove or add energy, respectively, from the gait of the robot, by scaling the amount of leg retraction or extension as a direct function of a measured forward velocity and a desired forward velocity.

12. A method for according to claim 11, comprising scaling torso control authority in response to a defined component of a measured ground reaction force.

13. The method according to claim 11, wherein the at least one leg spring comprises a leaf spring.

14. The method according to claim 11, wherein the step of measuring the force and the torque comprises measuring the displacement of the at least one leg spring.

15. The method according to claim 11, comprising switching between swing phase and stance phase control when a defined component of a measured ground reaction reaches a predetermined threshold.

* * * * *